(No Model.) 2 Sheets—Sheet 1.

J. H. W. DOERING.
ROLLING AND ADJUSTABLE WINDOW SCREEN.

No. 424,280. Patented Mar. 25, 1890.

WITNESSES:
F. G. Fischer
A. A. Higdon

INVENTOR:
J. H. W. Doering
BY J. C. Higdon
his ATTORNEY (No Model.) 2 Sheets—Sheet 2.
J. H. W. DOERING.
ROLLING AND ADJUSTABLE WINDOW SCREEN.
No. 424,280. Patented Mar. 25, 1890.
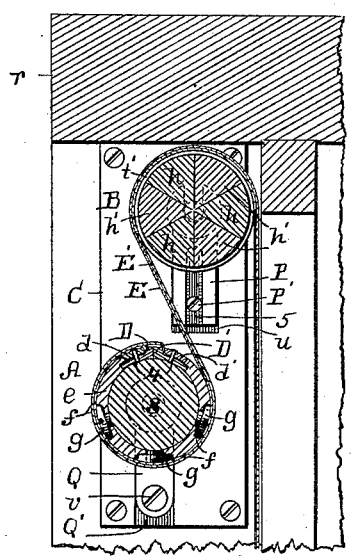
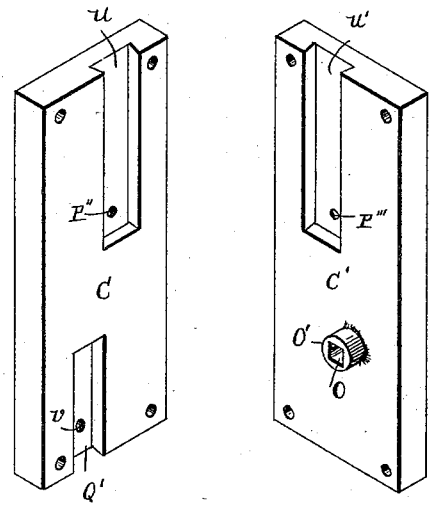
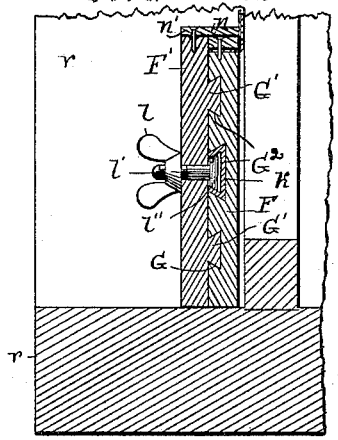
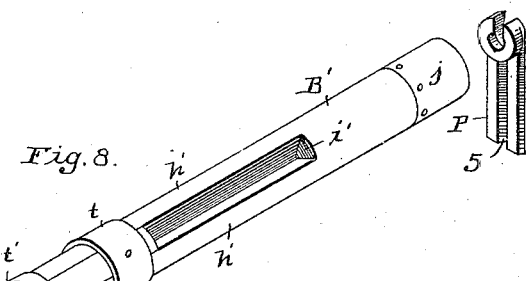
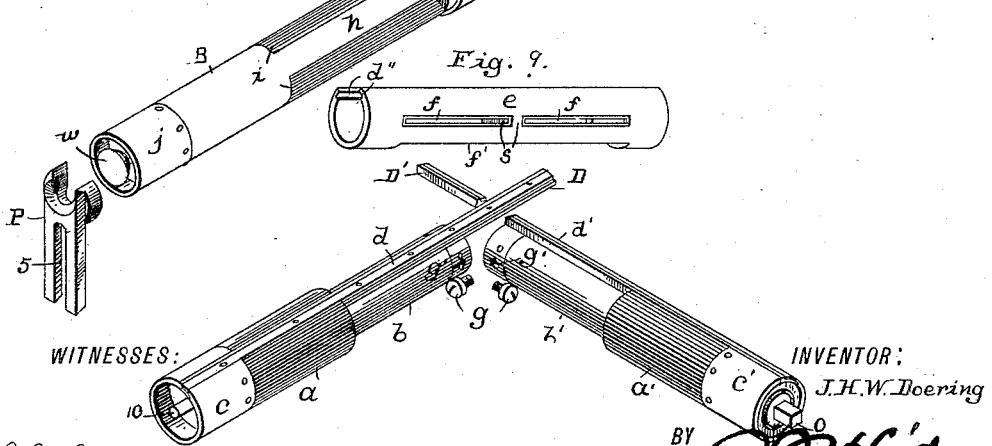
WITNESSES:
F. G. Fischer
A. A. Higdon
INVENTOR:
J. H. W. Doering
BY J. C. Higdon
his ATTORNEY.

UNITED STATES PATENT OFFICE.

JOHN H. W. DOERING, OF KANSAS CITY, MISSOURI, ASSIGNOR TO ELIZABETH DOERING, OF SAME PLACE.

ROLLING AND ADJUSTABLE WINDOW-SCREEN.

SPECIFICATION forming part of Letters Patent No. 424,280, dated March 25, 1890.

Application filed May 28, 1889. Serial No. 312,349. (No model.)

*To all whom it may concern:*

Be it known that I, JOHN H. W. DOERING, of Kansas City, Jackson county, Missouri, have invented certain new and useful Improvements in Rolling and Adjustable Window-Screens, of which the following is a full, clear, and exact description, reference being had to the accompanying drawings, forming a part hereof.

My invention relates to improvements in adjustable window-screens; and it consists in a certain novel construction and combination of devices, fully described hereinafter in connection with the accompanying drawings, and specifically pointed out in the claims.

Figure 1:
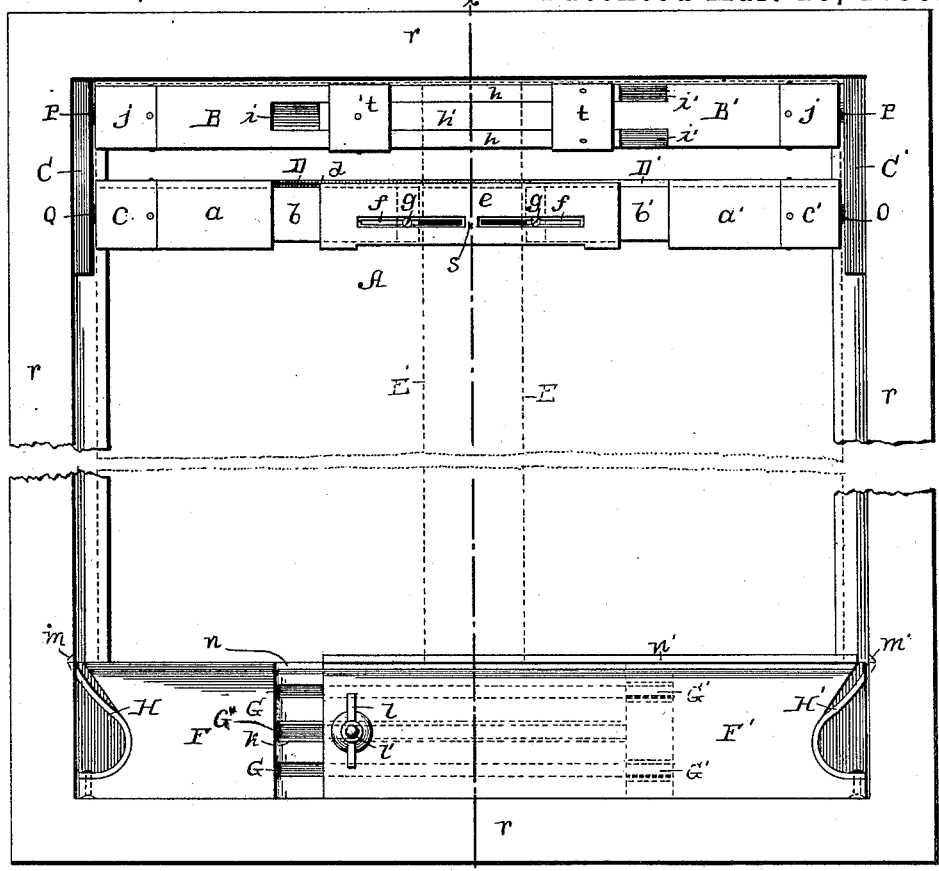
Figure 2:
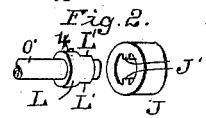
Figure 3:
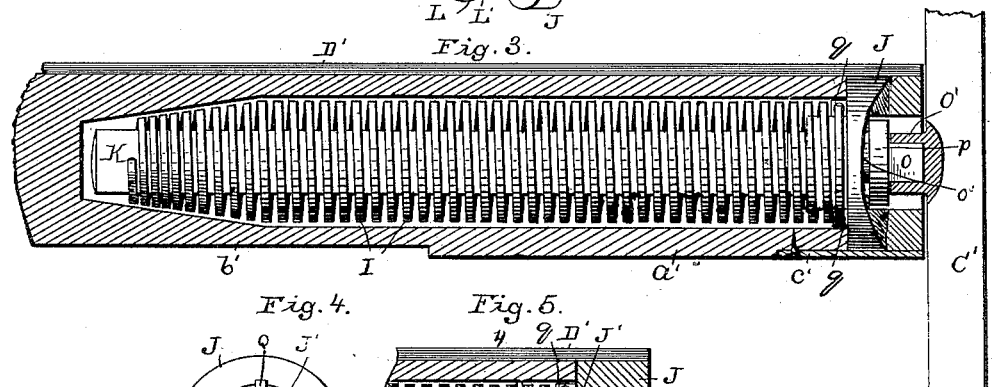
Figures 4, 5:
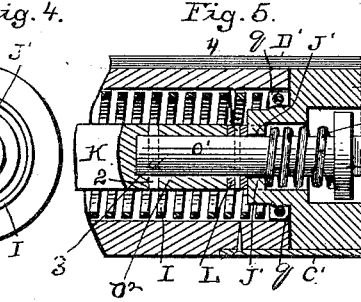

In the drawings, Figure 1 is a front view, partly broken away, of a screen embodying my improvements applied to a window-frame. Fig. 2 is a detail view of the ring and the clutch for preventing the unwinding of the operating-spring when the roller is removed from the brackets. Fig. 3 is a longitudinal sectional view of one end of the spring-roller, showing the spring, clutch, and other operating parts arranged therein. Fig. 4 is a detached view of the ring and clutch, looking outward and showing a portion of the operating-spring to illustrate the manner of connecting the same to the ring. Fig. 5 is a longitudinal sectional view of the end of the roller, showing the ring and clutch in section, with the various parts in the position which they assume when the roller is removed from the brackets. Fig. 6 is a vertical sectional view on the line $x$ $x$ of Fig. 1. Fig. 7 is a detail perspective view of the brackets. Fig. 8 is a perspective view of the guide-roller extended and detached from its supporting-tongues, and Fig. 9 is a perspective view of the operating-roller with its parts detached.

In the construction of my improved window-screen I employ an adjustable operating-roller A, which is formed in sections $a$ $a'$, having inner reduced ends $b$ $b'$, which fit in a metallic longitudinally-slotted sheath $e$. Set-screws $g$ $g'$ project through slots $f f$ in this sheath and engage the ends $b$ $b'$, whereby the sections of the roller may be adjusted at any desired extension to suit the width of the window-frame to which it is applied. The wire screen or netting is also formed in sections E E', which overlap at their adjacent inner edges, as shown in Fig. 1, and are secured at their upper ends to the sections $a$ $a'$, respectively, by means of grooved clamping-strips D D' and removable retaining-strips $d$ $d'$, which fit in the grooves of the clamping-strips and are secured therein by means of rivets, screws, or equivalent devices. The clamping and retaining strips extend inward beyond the extremities of the sections $a$ $a'$, and they are arranged side by side in juxtaposition, so that the sections of the screen are held close together to prevent the entrance of insects. The clamping and retaining strips operate in the open side or slot of the sheath, the latter being provided at its center with a strengthening-web $s$ to hold it in shape.

Secured to one end of the roller by means of a ferrule is a ring J, through which passes a rod $o'$, having a square head $o$ and a collar $p$ at its outer end. Said rod carries a coiled spring M, which is arranged within the ring J, and bears at its outer end against the collar $p$ and at its inner end against lugs J' J', cast integral with the said ring. A wooden core K is arranged in a bore or recess in the end of the roller, and the operating-spring I, which is coiled thereon, is attached firmly at its outer end to lugs $q$ $q$ on the ring J and at its inner end to the core, whereby, when the ring rotates independently of the core, the spring is wound or unwound. The rod $o'$ fits in a socket $o^2$ in the end of the core K, and is held in place by means of a transverse pin 2, which passes through a slot 3 in the rod, and thereby prevents independent rotary movement of the rod and core and prevents the spring from unwinding.

Brackets C C' are secured to opposite sides of the window-frame, the bracket C' being provided with a square socket O, formed in a projection O' thereof to receive the square head of the rod $o'$ and hold the latter and also the core K stationary.

The clutch L consists of a collar fitting on the rod $o'$ close to the inner edge of the ring J and provided in its outer edge with notches L' to receive the lugs J' when the rod is forced out by the spring M to the position shown in Fig. 5, thereby firmly locking the ring to the rod and preventing independent rotation thereof. The clutch is secured to the rod by a pin 4. When the roller is applied to the brackets, the rod $o'$ is pressed inward against the tension of the spring M, thereby disengaging the clutch from the lugs J′ and permitting the operating-spring to act directly on the ring J, and when the roller is removed from the brackets the rod is forced outward by the spring M and the clutch engages the said lugs, thereby locking the ring in position and preventing the operating-spring from uncoiling. Suitable ferrules $c\ c'$ are fitted on the ends of the spring-roller, the ferrule $c'$ serving to hold the ring J in place. The section $a$ of the roller is provided with a trunnion 10, journaled in a dovetailed tongue Q, which fits in a corresponding groove in the bracket C, the said tongue being locked in place in the said groove by means of a set-screw $v$, which engages a tapped aperture $v'$ in the bracket.

The lower end of the netting is secured to an adjustable strip, which consists of independent sections F F′, the former of which is provided with grooves G G to receive dovetailed tongues G′ G′ on the latter, whereby the strip may be extended to correspond in length with the spring-roller. The section F is also provided with a central dovetailed groove G″, in which is located the dovetailed or wedge-shaped head $l''$ of the adjusting-bolt $l'$, carried by the section F′. The groove G″ is provided with a metallic lining $k$ to prevent the head of the adjusting-bolt from pulling out of the groove, and the outer end of the bolt is engaged by a wing-nut $l$, which, when tightened, clamps the sections of the strip in any desired position. The strip is provided at its extremities with flat springs H H′, which engage at their free ends in notches $m\ m'$ near the bottom of the window-frame to hold the screen in its extended or operative position. These springs are of sufficient strength to hold the lower end of the screen at any desired distance above the ledge of the window by frictional contact with the sides of the window-frame. The springs are countersunk in the inner surface of the strip, and therefore can only be manipulated to release the screen from the inside.

The guide-roller, which is arranged close to the top of the window-frame and over which the netting passes, consists of the sections B B′, the inner or adjacent ends of which are provided with triangular tongues $h\ h'$, which mesh with each other, and thereby permit the sections to be longitudinally adjusted with relation to each other. To obviate the danger of the ends of the tongues coming out of place, and also to prevent the sections B B′ from being too easily moved, I provide the ends of the tongues with metallic collars or ferrules $t\ t'$, which hold the sections in position by frictional contact. The ends of the guide-roller are fitted with trunnions $w$, which are mounted in tongues P, arranged in dovetailed grooves $u\ u'$ in the brackets, said tongues being secured in place by the set-screws P′, which engage tapped apertures P″ in the brackets. The said trunnions $w$ are headed to fit the correspondingly-shaped bearings in the tongues, whereby all danger of the ends of the guide-roller becoming detached is obviated, and said tongues are provided with vertical slots 5, which receive the set-screws P′, to enable the guide-roller to be vertically adjusted to bring its upper surface close to the top of the window-frame, and thereby exclude insects.

The operation of the improved screen will be obvious from the above description. When it is desired to raise or remove the same, the springs H H′ are repressed until their free ends are disengaged from the notches $m\ m'$ and out of contact with the sides of the window-frame, thereby permitting the spring-roller to wind up the netting, and when the screen is to be extended it is simply drawn down, the springs H H′ engaging the frame and locking the strip at the lower end of the netting in the desired position.

In adjusting my improved screen to a window-frame care must be taken to bring the upper surface of the guide-roller as near the top of the frame as possible to allow the netting to pass, and the spring-roller must be arranged at such a distance below the guide-roller as to prevent the outer layer of the netting from touching the latter when the screen is rolled up.

Having thus described my invention, what I claim, and desire to secure by Letters Patent, is—

1. In a window-screen, the combination of a spring-roller consisting of longitudinally-adjustable sections provided with reduced inner ends, the sleeve fitting on said reduced ends, and a screen or netting consisting of separable overlapping sections which are secured at their upper edges, respectively, to the sections of said roller, substantially as specified.

2. In a window-screen, the combination of an extension spring-roller consisting of longitudinally-adjustable sections, the wire screen or netting consisting of independent overlapping sections secured at their upper ends to the sections of the roller, respectively, and the extension-strip consisting of longitudinally-adjustable sections secured, respectively, to the lower ends of the sections of the netting and provided with springs to engage the window-frame, substantially as specified.

3. In a window-screen, the combination of a spring-roller consisting of longitudinally-adjustable sections provided with grooved clamping-strips which extend beyond the inner ends of said sections and overlap each other, the retaining-strips fitting in the grooves of said clamping-strips, and the screen or netting formed in overlapping sections, the upper edges of which fit in the grooves of the clamping-strips and are engaged by the retaining-strips, substantially as specified.

4. In a window-screen, the spring-roller consisting of independent sections fitting at their adjacent ends in a slotted sheath which is provided with set-screws to engage the sections, the clamping and retaining strips secured to the sections and overlapping each other at their inner ends, and the wire-netting engaged by said clamping and retaining strips, substantially as specified.

5. In a window-screen, the roller provided with a stationary core carrying the operating-spring, the rod secured to the end of the core and provided with a collar and a square head to engage a corresponding socket, the ring fitted to the end of the roller and provided with lugs, the clutch secured to the rod and provided with notches L' to engage the said lugs, and the coiled spring bearing at its ends against the lugs and the said collar, substantially as specified.

6. In a window-screen, the roller provided at one end with a ring provided with lugs J', the operating-spring coiled on a suitable core and attached at its free end to the said ring, and the longitudinally-movable rod attached to the core and provided with a clutch having notches L' to engage the said lugs and carrying a spring to normally hold the clutch in engagement with the lugs, in combination with wire-netting secured to the roller, substantially as specified.

7. In a window-screen, the combination, with a roller carrying a screen and provided at one end with a bore or recess, of the longitudinally movable or sliding core arranged in said bore or recess and carrying the operating-spring, the stationary ring on the end of the roller, connected to one end of said operating-spring and provided with lugs J', the square-headed rod secured to the core, and the clutch mounted on said rod and provided with notches to engage the lugs J', substantially as specified.

8. In a window-screen, the combination, with a hollow roller carrying a screen, of a longitudinally-movable core arranged within said roller and provided at its outer end with a square-headed rod having a collar $p$, the ring secured to the end of the roller around the said rod and provided with lugs J', which project toward the rod, the clutch carried by the core and provided with notches to engage said lugs, and the spring M, coiled on the said rod between the collar $p$ and the lugs, substantially as specified.

In testimony whereof I affix my signature in presence of two witnesses.

JOHN H. W. DOERING.

Witnesses:
F. G. FISCHER,
A. A. HIGDON.